Oct. 1, 1929.  T. M. EYNON  1,729,770
DASHBOARD LIQUID LEVEL INDICATOR
Filed June 16, 1921
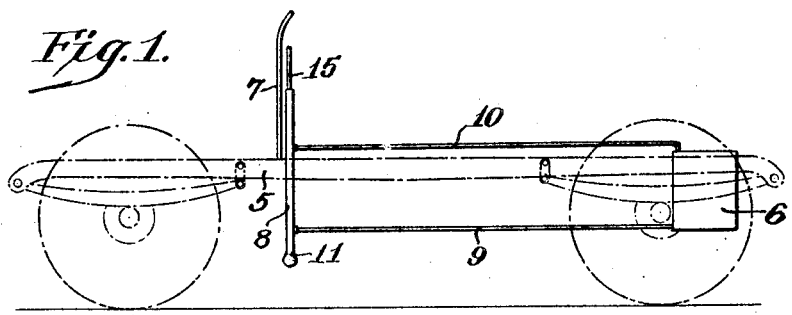
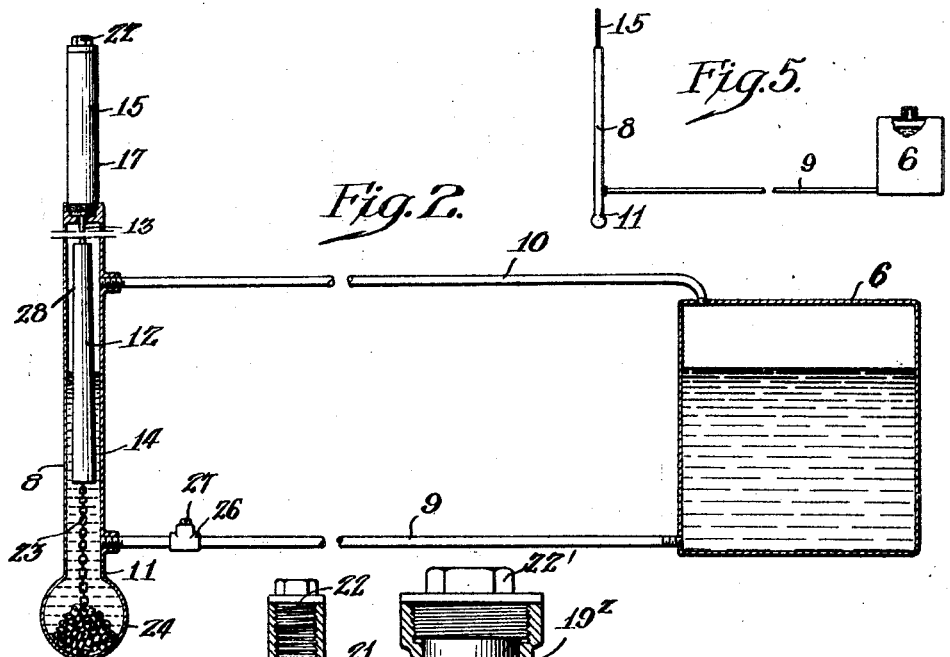
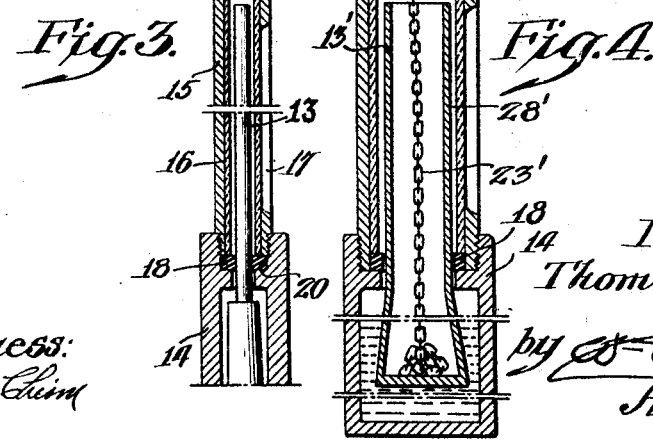

Patented Oct. 1, 1929

1,729,770

UNITED STATES PATENT OFFICE

THOMAS M. EYNON, OF PHILADELPHIA, PENNSYLVANIA

DASHBOARD LIQUID-LEVEL INDICATOR

Application filed June 16, 1921. Serial No. 477,950.

My invention relates to devices for showing at the dash-board of an automobile the height or quantity of gasoline in an automobile tank.

The main purpose of my invention is to locate a float indicator at the dash-board and to operate it from the gasoline of the tank.

A further purpose is to reduce the range of movement of a float indicator at the dashboard and connect the chamber in which the float is submerged with the gasoline tank.

A further purpose is to cause the float indicator for gasoline to pick up additional weight with rise of the gasoline in the float chamber in order to reduce the range of movement of the float.

A further purpose is to vary the cross-section of that portion of the float which is submerged at one time and above the gasoline level at another time so as to reduce the change of weight of this portion when submerged.

A further purpose is to provide for constriction of the passage between the gasoline tank and the float chamber so as to retard the flow of gasoline between them which takes place with variation in their respective heights.

I have preferred to illustrate my invention by but one main form and a slight modification of the range-reducing mechanism, selecting a form which is practical, efficient and inexpensive and which at the same time well illustrates the principles of my invention.

Figure 1 is a side elevation of a chassis in outline to which my invention is applied.

Figure 2 is an enlarged view chiefly in section showing the mechanism mounted upon the chassis in Figure 1.

Figures 3 and 4 are sections of the upper part of Figure 2 and of a structure having modified range varying mechanism, respectively, embodying my invention.

Figure 5 is a reduced side elevation of a form in which no pressure is used.

In the drawings similar numerals indicate like parts.

In the indication at the dash-board of the height of gasoline in the tank, it is quite desirable to place the entire indicating mechanism at the dash. My invention has been directed toward this end. I seek to accomplish it by placing a float chamber at the dashboard, connecting it to utilize the height of gasoline in the tank and operating the indicator directly or indirectly from the float. The height of the indicator with respect to the float, of course, depends upon the height of gasoline in the float chamber and the convenience or inconvenience of observing this directly from the float.

Describing the mechanism shown, by way of illustration and not in limitation:—

The chassis 5 is intended to be typical of any gasoline controlled car in which there is a fuel tank 6 and a preferred convenient point of observation outside thereof such as on or in proximity to a dash-board 7. I place a float chamber 8 at this convenient point for observation by the operator and connect it with the tank by a pipe located below the lowest intended gasoline level at 9 and, where pressure is used upon the gasoline surface in the tank, I connect another pipe above this level at 10, thus providing for equalization of pressure and height of gasoline in the tank and float chamber, respectively. Where there is no tank pressure, as may be the case in any of the figures, the upper connection may be omitted.

The float chamber is extended below the level of the bottom of the tank, as at 11 for the purpose of providing room for the extension of the float into this extension at low levels of gasoline so as to indicate these levels. Where the range of movement of the float is to be reduced by a depending "pick up" weight, this may also provide space for this "pick up" weight without interfering with the submergence of the float within the extension at low gasoline levels.

The float 12 may carry an indication directly upon it for observation through a sight tube, where the height of the tank is sufficient to make the float height readily observable from the driver's seat or other preferred location. Where this is not the case, and as shown in Figure 2, the float may be extended in the form of an indicator 13 at a more convenient height.

The float chamber is preferably made of metal in the form of a tube 14, because of the strength and cheapness of this construction, and the upper part shown in Figures 2 and 3 is also preferably metal in the form of a tube 15 which is lined with glass at 16 so that the position of the indicator (extension) 13 may be observed through the side opening 17 (Figure 3) with or without the use of a scale thereon as desired.

The glass and upper metal tubes are sealed against leakage by packing 18 at the bottom and by packing 19 at the top. The packing 18 may be held in place by screwing the tube 16 down upon the packing within recess 20 or by pressing the glass tube against it from the top. At the top, the packing 19 is sealed against the top of the tube by a plug 21 secured within the upper part of the tube and which forces the glass down against the packing 20 to effect the sealing of the glass tube at both ends. The upper end of the tube 15 is closed conveniently by a plug cap 22.

As thus far outlined, without the use of the "pick up" retarding mechanism, the float would have a movement corresponding in height range to the extent of variation of the level of the gasoline within the float chamber and within the tank.

Because any such extent of movement is not necessary and would be undesirable, I prefer to reduce the range of movement of the float, with or without calibration of the indication to show the actual quantity or height of gasoline in the tank which corresponds with any given height of the float and indicator.

The retarding of range of movement of the float is accomplished through a "pick up" mechanism by which the float is weighted increasingly with increased upward movement. In other words, upward movement of the float causes it to "pick up" weight or weights progressively, which causes the float to sink more deeply in the gasoline. This weight or these weights may be added in various ways, of which I show two; not with the purpose or thought of attempting to show all ways, as I know other mechanisms by which this may be accomplished, but merely for the purpose of indicating that this "pick up" effect may be secured in a variety of ways.

In Figure 2 I show a chain 23 depending from the float and adapted to rest in the bottom 24 of the float chamber except as it is lifted therefrom by lifting of the float. The lower part of the extension 11 is enlarged as at 24 to give additional room for the chain.

In Figure 4 I show a chain 23' depending from a plate 25 resting upon a gasket 19' and held in place by a plug cap 22'. A cushion 19² distributes the pressure of the cap. In this second form the indicating extension 13' is made of relatively large diameter so as to receive the chain 23' freely.

It will be noted that in Figure 2 the increase of weight of chain picked up by rise of the float is reduced by the displacement of gasoline by the chain, so that the same size of chain will not add quite so much weight in this form as in the form shown in Figure 4 where no such displacement of gasoline reduces the weight of the chain.

Where the chain is used the addition of weight will be somewhat discontinuous as compared with lifting a more fully uniform flexible weight, both because there are links and because of the lost motion between the links. Because of the rigidity of the links, the flexibility is restricted to their connecting points. This, however, does not interfere with the success of the construction.

In order to still further reduce the extent of range of float movement I reduce the cross-sectional area of the upper part 28 or 28' of the float so as to cause additional submergence to affect the weight less than would otherwise be the case so that the weight added by the "pick up" provision may cause greater submergence than would otherwise be the case. Successive links of the chain may be made of different weight to vary the "pick up" values. If made heavier at the lower end than at the top (Figure 2) or at the upper end (Figure 4) the range of float movement may be still further reduced.

Where desired the passage between the tank and float chamber beneath the gasoline level may be constricted, either by selecting a small size pipe or by obstructing the passage. In order to illustrate such a construction, capable of use, I have shown a fitting 26 within the pipe 9 and within this fitting I place a screw valve 27 which may be closed to greater or less extent to adjust the opening through which the gasoline must pass or to fully open the passage. The same construction can be utilized to close the passage altogether when it is desired to repair the mechanism.

In operation, the parts are assembled in such position that the indicator will show zero when the tank is empty and with preliminary determination of a proper range of indicator movement. The "pick up" mechanism should be selected so as to maintain this range.

When the desired range has been secured by a selected "pick up" mechanism with or without reduction of the cross-sectional area of the portion of the float which is progressively submerged, the entire range of indicator movement may be adjusted initially within the indicator opening by lifting or lowering the float chamber upon the dash, after which these parts may be standardized sufficiently to permit quick application with or without variation in height on the dash as may be required. The device is operative as a comparative guide or, with markings upon a scale, more accurate readings may be secured, calibrating where necessary.

It will be obvious that this mechanism is dependent upon a predetermined relation of heights between front and rear wheels of the car for accurate indication. It is most desirably set for indication at level car positions and the condition of the car level can be determined by a separate spirit level for initial setting and for subsequent use if desired. When the front wheels are lower than the rear wheels the indication given will be correspondingly higher than the float and where the front wheels are higher than the rear wheels the indication given will be lower than the float. Fluctuation during ordinary use may be reduced and substantially eliminated by constricting the passage to pipe 11 so that no quick change of liquid level can take place; with the result, however, that an erroneous indication which may have resulted from having the car stand with the front and back at different levels would persist for a longer time than if free flow of gasoline be provided between the float chamber and the tank.

Control of the constriction at 27, as by using a quick-operating valve (such as flap valve) controlled by lever, rod or chain from the driver's position would obtain the benefit of the constriction and yet permit quick indication when on level road.

It will be obvious that all or a part of my invention may be presented in other forms, as appeals to the whim or need of those skilled in the art; and it is my purpose to include all such forms within my invention as come within its reasonable spirit and scope.

Having thus described my invention, what I claim as new and desire to secure by Letters Patent is:—

1. In a dash-board indicator of gasoline tank content, the combination with an automobile gasoline tank, of a float chamber having a range of gasoline height corresponding nearly in comparative height to that of the tank and extending with the tank and in convenient position for observation by the operator, a connection affording communication between the tank and the float chamber below the normal gasoline level, a float in the float chamber, a series of interconnected weights adapted to be supported to varying extents by the float, the weight connections being such that the weights are progressively picked up by the float with rise of gasoline level in the float chamber, thereby causing progressive diminution of the portion of the float observable above the float chamber and means for supporting the weights of the series not so picked up.

2. In a dash-board indicator of gasoline tank content, the combination with an automobile gasoline tank, of a float chamber having a range of gasoline height corresponding nearly in comparative height to that of the tank and extending with the tank and in convenient position for observation by the operator, a float in the float chamber, a connection affording communication between the tank and the float chamber below the normal gasoline level, a series of interconnected weights connected at one end to said float and capable of progressive support thereby, the weight connections being such that the weights are lifted progressively by lifting movement of the float due to rise of gasoline level in the float chamber, and means for supporting the weights of the series not so picked up.

3. In a dash-board indicator, of gasoline tank content, the combination of an automobile gasoline tank, walls forming an indicator float chamber adapted to contain gasoline to a height corresponding to the height of gasoline in the tank, a connection affording communication between the tank and float chamber below the normal gasoline level, a float in the float chamber whose height is observable by the operator, said float being smaller at its upper part than at its lower part within the intended range of submergence and a plurality of interconnected weights adapted to be progressively picked up by the float, each weight being lifted through the preceding weight.

4. In a dash-board indicator, of gasoline tank content, the combination of an automobile gasoline tank, walls forming an indicator float chamber adapted to contain gasoline to a height corresponding to the height of gasoline in the tank, a connection affording communication between the tank and float chamber below the normal gasoline level, a float in the float chamber adapted to be observed by the operator and smaller at its uppermost part than at its lowermost part within the intended range of submergence in the gasoline and a chain hanging from the float, the number of links thereof lying piled in the bottom of the float chamber being increased at low levels.

5. In a dash-board indicator for gasoline tank content, the combination of a float chamber, a float therein, of progressively smaller cross section from the bottom to the top of the portion adapted to be either immersed or exposed, a weight attached to the float formed of interconnected parts, the lower part being supported by the bottom of the float chamber, the weight being lifted or lowered progressively with movement of the float and thus adapted to exercise less pull upon the float with lowering of the level of liquid in the chamber and indicating means carried by the float for showing the height of the float.

6. In a dash-board indicator for gasoline tank content, the combination of a float chamber, a float therein of gradually reduced cross section from the bottom upwardly of that portion adapted for either immersion in the liquid or exposure thereabove, a chain secured at one end to the float and adapted to pile up at its other end in the bottom of the chamber as the float goes down and an indicator attached to and movable with the float to show the position of the float.

THOMAS M. EYNON.